Patented Sept. 21, 1954

2,689,816

UNITED STATES PATENT OFFICE 2,689,816

PROCESS FOR PRODUCING DEXTRAN

Earl R. Kooi, La Grange, Ill., assignor to Corn Products Refining Company, New York, N. Y., a corporation of New Jersey No Drawing. Application December 26, 1952, Serial No. 328,154

5 Claims. (Cl. 195—31)

This invention relates to an improved method of producing dextran by the action of "dextran-forming" bacteria on polysaccharide materials. More particularly it relates to a process for producing dextran from amylaceous materials.

A large proportion of the dextran currently produced is made from sucrose. Not only is sucrose a costly raw material source but a variety of by-products, i. e., levan, mannitol, lactic acid, levulose, are formed in addition to the dextran. The presence of these by-products is undesirable in some applications of dextran and therefore they must be separated from the dextran. However, the separation is complicated in the case of levan. Dextran is separated from the fermentation liquor by precipitation by means of alcohol, acetone, or similar compounds. The levan is also precipitated by alcohol and must be removed by fractional precipitation, which is a complicated procedure, and adds considerably to the cost of obtaining pure dextran. Other carbohydrate materials have been suggested as a source of dextran but the low yields obtained therefrom, after only long periods of time for the fermentation, have not been sufficiently attractive to permit large scale production of dextran. Furthermore, a considerable proportion of the raw source material could not be utilized by the dextran-forming organism and was precipitated along with the dextran by alcohol, acetone, etc., and some difficulty was involved in the purification of the dextran.

An object of the present invention is to provide an improved method of producing dextran whereby the formation of undesirable by-products which are difficult to separate from dextran is avoided. A further object is to provide a process for producing dextran in high yields whereby the by-products formed are easily and economically separated from the dextran. A further object is to provide a means of decreasing the time required for the formation of dextran from carbohydrate materials. Still a further object is to provide an economical source of carbohydrate for the production of dextran. These and other objects will appear more fully hereinafter from the description of the invention.

I have discovered that when an acid hydrolyzate of starch having a D. E. value within the range of about 15 to 30 is fermented with an organism from the group consisting of *Acetobacter capsulatum* and *Acetobacter viscosum*, excellent yields of dextran may be obtained without co-precipitation of source materials during the purification step. I have further discovered that the time of fermentation may be reduced considerably by aeration and agitation of the fermentation medium during the fermentation.

In carrying out the process of my invention, starch is hydrolyzed with acid in conventional manner until the D. E. value (dextrose equivalent, i. e., per cent of reducing sugars, on dry basis, calculated as dextrose) is within the range of about 15 to about 30. The pH of the resultant starch hydrolyzate is adjusted to 4.5 to 5.5, and then the hydrolyzate is skimmed or filtered. Thereafter the solids content is adjusted to about 5 per cent and there is added to the concentrated liquor about 0.5 gram per 100 ml. of an organic nitrogenous material, such as dehydrated yeast extract, corn steep liquor, or the like. The pH of the liquor is then adjusted to 5.5 to 6.8 and the liquor is sterilized in known manner, e. g., at 121° C. for 20 minutes. Next the resultant fermentation medium is cooled to about 25° C. to 30° C., and thereafter it is inoculated with a suitable culture grown 10 to 48 hours on the same medium as heretofore described in amount within the range of about 2 to about 20 per cent by volume of fermentation medium. The medium is agitated and aerated, as for example, at the rate of about 0.1 volume of air per volume of medium per minute for a period of about 24 to about 72 hours during which time the temperature is maintained at about 25 to about 30° C.

It has been found that the rate of dextran formation can be markedly increased by agitation and aeration of the culture liquor. This was an unexpected result in view of the fact that the fermentation involved is not an oxidation fermentation. In fact, several workers in the field have stated that aeration is unfavorable to the formation of dextran from sucrose.

The rate of dextran production and the concentration at which the substrate can be efficiently converted to dextran can be effectively increased by starting the fermentation at a carbohydrate concentration of not more than about 10 grams per 100 ml. and adding a concentrated solution of the carbohydrate material after active fermentation has begun. An additional means of insuring rapid dextran formation at high carbohydrate concentrations is to maintain the pH of the culture liquor at about 5.5 to 6.5 for the first 10 to 24 hours, and thereafter at about 3.5 to 5.0 until the fermentation is completed.

After the dextran content of the fermentation liquor has reached a maximum, the dextran therein may be precipitated by the addition of methanol, ethanol, acetone, or the like, in the amount of about 37 to about 43 per cent by volume. The precipitated dextran may be removed and dried.

The by-products of the fermentation of the media heretofore described consist essentially of gluconic acid, 5-keto-gluconic acid, and residual dextrins. These being readily soluble are not precipitated by the alcohol required to precipitate dextran, hence, the purification of dextran is simple. Thus, it is readily apparent that the present invention represents a distinct advancement in the art.

Any starch, e. g., corn (maize), rice, wheat, potato, grain sorghum, and the like, may be used in producing the substrate.

The organisms which are satisfactory for purposes of my invention include *Acetobacter capsulatum* and *Acetobacter viscosum*, the former being the preferred organism when the concentration of the substrate is higher than about 5 grams per 100 ml.

In place of dehydrated yeast extract or corn steep liquor as a source of nitrogen, there may be used peptone, malt sprouts, casein, beef extract or malt extract or corn gluten.

Aeration may be accomplished in any known manner, as for example, by agitation, while allowing free access of air to the surface of the liquor, or by blowing air or oxygen through the culture medium.

The following examples which are typical and informative only and not to be construed in a limiting sense, will further illustrate my invention:

EXAMPLE I

A medium composed of 10 grams of corn starch acid hydrolyzed to 18 D. E. and 1.0 gram of dehydrated yeast extract in a total volume of 200 ml. was adjusted to pH 6.8 and placed in a 500 ml. Erlenmeyer flask. The flask was plugged with cotton and sterilized at 15 pounds steam pressure for 20 minutes. After cooling to 25° C., the contents of the flask were inoculated with 20 ml. of a 24 hour culture of *Acetobacter capsulatum* grown on 0.2 per cent dextrose 0.5 per cent yeast extract medium under aerobic conditions. The inoculated medium was agitated vigorously at a temperature of 25–28° C. After 6 hours, the pH had decreased to 4.3 and was adjusted to a value of 6.0. At 24, 48, and 72 hours after inoculation, 20 ml. of a 50 gram per 100 ml. solution of 18 D. E. acid hydrolyzed corn starch was added, and at the same time the pH of the medium was brought to a value of 4.5. After 6 days fermentation there was obtained a yield of dextran equivalent to 38 per cent by weight of the carbohydrate added.

EXAMPLE II

This example shows that when the fermentation medium is aerated and agitated, the maximum yield is reached in less than half the time required for the fermentation when aeration alone is used.

A fermentation medium was prepared by adding to water 4.0 per cent of an 18 D. E. acid hydrolyzate of corn starch and 0.5 per cent of dehydrated yeast extract. About 200 ml. of the resulting mixture, having a pH value of 5.5, was placed in 500 ml. flasks, the flasks were plugged with cotton, and sterilized. The media were then cooled to 28° C. and inoculated with about 10 per cent by volume of an actively growing culture of *Acetobacter capsulatum*. One-half of the flasks were aerated by shaking the flasks in the presence of air to supply oxygen to the organisms. One-half of the flasks were allowed to remain quiescent but free access of air was allowed.

Table I

| Time in Days | Yield of dextran, weight percent | |
|---|---|---|
| | Aerated by Agitation | Not Agitated |
| 2 | 37.5 | |
| 3 | 40.0 | 12.1 |
| 6 | 42.1 | 35.1 |

EXAMPLE III

A fermentation conducted in the same manner as in Example I, but using a culture of *Acetobacter viscosum* yielded dextran in the amount of 42 per cent by weight of the carbohydrate originally present.

EXAMPLE IV

This example will show the disadvantages of using acid hydrolyzates of starch having D. E. values above and below the range specified for the present invention.

Fermentation media composed of 4.0 per cent of acid hydrolyzate of corn starch and 0.5 per cent of dehydrated yeast extract were prepared. About 200 ml. of medium were placed in 500 ml. flasks, and the flasks were plugged with cotton, sterilized, cooled to 26–28° C., and inoculated with about 10 per cent by volume of active cultures of either *Acetobacter capsulatum* or *Acetobacter viscosum*. The flasks were then incubated at 26–28° C. while aerating by shaking the flasks in the presence of air. After 3 days, 0.7 volume of ethanol was added per volume of fermentation liquor. The dextran which precipitated was dried and weighed. The D. E. values of the substrates, the yields of dextran and the amounts of byproducts are shown in Table II.

Table II.—D. E. of acid hydrolyzed starch

ACETOBACTER CAPSULATUM

| | 5 | 16 | 18 | 31 | 47 | 59 |
|---|---|---|---|---|---|---|
| Yield of dextran, wt. percent: | | | | | | |
| 1 day | 3 | ---- | 31 | 20 | 12 | 7 |
| 2 days | 13 | ---- | 40 | 30 | 12 | 7 |
| 3 days | 20 | 42 | 40 | 30 | 12 | 8 |
| Yield of acid (3 days), wt. percent | 4 | 13 | 14 | 26 | 44 | 52 |
| Starch in recovered dextran | + | 0 | 0 | 0 | 0 | 0 |

ACETOBACTER VISCOSUM

| | 5 | 16 | 18 | 31 | 47 | 59 |
|---|---|---|---|---|---|---|
| Yield of dextran, wt. percent: | | | | | | |
| 1 day | 3 | ---- | 16 | 15 | 10 | 6 |
| 2 days | 17 | ---- | 33 | 30 | 13 | 8 |
| 3 days | 27 | ---- | 40 | 30 | 11 | 7 |
| Yield of acid (3 days), wt percent | 5 | ---- | 16 | 28 | 41 | 51 |
| Starch in recovered dextran | + | ---- | 0 | 0 | 0 | 0 |

It will be noted from the results set forth above that if the D. E. value of the hydrolyzate is too low that starchy materials will be recovered in the dextran and that if the D. E. value of the hydrolyzate is too high, the amount of acid formed is so high that the process is uneconomical.

I claim:

1. The process of producing dextran which comprises fermenting with an organism from the group consisting of *Acetobacter capsulatum* and *Acetobacter viscosum* a fermentation medium comprising a source of nitrogen and an acid starch hydrolyzate having a D. E. value within the range of about 15 to about 30.

2. The process according to claim 1 wherein the fermentation medium is agitated and aerated during the fermentation.

3. The process according to claim 1 wherein the pH of the fermentation medium is maintained at about 5.5 to 6.5 during the first 10 to 24 hours of the fermentation and at 3.0 to 5.0 thereafter.

4. The process according to claim 1 wherein the fermentation medium is agitated and aerated during the fermentation and wherein the pH of the fermentation medium is maintained at about 5.5 to 6.5 during the first 10 to 24 hours of the fermentation and at 3.0 to 5.0 thereafter.

5. The process of producing dextran which comprises fermenting with an organism from the group consisting of *Acetobacter capsulatum* and *Acetobacter viscosum* a fermentation medium comprising a source of nitrogen and a starch hydrolyzate having a D. E. value within the range of about 15 to about 30, wherein the fermentation is started with a part of the substrate and the remainder thereof is thereafter added incrementally.

References Cited in the file of this patent

UNITED STATES PATENTS

| Number | Name | Date |
|---|---|---|
| 2,386,994 | Waldie | Oct. 16, 1945 |

OTHER REFERENCES

Carruthers et al., Biochem. Jour. 30 (1936), pages 1001–1009.

Evans et al., "Bacterial Polysaccharides," Advances in Carbohydrate Chemistry, 1947, vol. 2, Academic Press, pages 206–214.

Bergey's Manual of Determinative Bacteriology, 1948, 6th ed., Williams and Wilkins, pages 188–189.